(12) United States Patent
Coffey et al.

(10) Patent No.: US 8,436,094 B2
(45) Date of Patent: May 7, 2013

(54) CURABLE COMPOSITIONS WITH MOISTURE-CURABLE FUNCTIONALITY CLUSTERS NEAR THE CHAIN ENDS

(75) Inventors: Roderick Coffey, Middletown, CT (US); Joel Schall, Hamden, CT (US); John G. Woods, Farmington, CT (US); Anthony F. Jacobine, Meriden, CT (US)

(73) Assignee: Henkel Corporation, Rocky Hill, CT (US)

( * ) Notice: Subject to any disclaimer, the term of this patent is extended or adjusted under 35 U.S.C. 154(b) by 12 days.

(21) Appl. No.: 12/868,159

(22) Filed: Aug. 25, 2010

(65) Prior Publication Data
US 2012/0053296 A1  Mar. 1, 2012

(51) Int. Cl.
*C08F 8/00* (2006.01)
(52) U.S. Cl.
USPC .......... 525/100; 526/90; 526/135; 526/147; 526/279
(58) Field of Classification Search .......... 525/100; 526/90, 135, 147, 279
See application file for complete search history.

(56) References Cited

U.S. PATENT DOCUMENTS
2007/0004880 A1* 1/2007 Nakagawa et al. ............ 526/90

FOREIGN PATENT DOCUMENTS
WO  2009155303  4/2010

OTHER PUBLICATIONS

Braunecker et al. (Prog. Polym. Sci. 32 (2007) 93-146).*
International Search Report issued in connection with International Patent Application No. PCT/US2011/048562 mailed on Mar. 15, 2012.
Koh, K. et al. 'Precision Synthesis of Organic/Inorganic Hybrid Nanocapsules with a Silanol-Functionalized Micelle Template.' In: Angew. Chem. Int. Ed., 2003, vol. 42, pp. 4194-4197. See pp. 4194-4195, figures 1, 3.
Mellon, V. et al. 'Block Copolymers of gamma-Methacryloxypropyltrimethoxysilane and Methyl Methacrylate by RAFT Polymerization. A New Class of Polymeric Precursors for the Sol-Gel Process. I In: Macromolecules, 2005, vol. 38, pp. 1591-1598. See pp. 1596-1597.
Du, J. et al. 'Atom-Transfer Radical Polymerization of a Reactive Monomer: 3-(Trimethoxysilyl)propyl Methacrylate.' In: Macromolecules, 2004, vol. 37, p. 6322-6328. See abstract, experimental section.

* cited by examiner

*Primary Examiner* — Van A Nguyen
(74) *Attorney, Agent, or Firm* — Steven C. Bauman; James E. Piotrowski (57) ABSTRACT

A process of controlled radical polymerization, and products made therefrom is disclosed. The process includes performing controlled radical polymerization on a composition comprising a polymerizable compound, an initiator, a ligand, and a catalyst; permitting the controlled radical polymerization reaction to proceed until a desired level of conversion is attained, but prior to complete conversion to obtain an intermediate polymerization product; and further reacting the intermediate polymerization product with a reactant having a cluster of multiple reactive sites to provide a polymer reaction product having a cluster of pendent multiple reactive sites adjacent to said terminal ends of said polymer reaction product.

16 Claims, 4 Drawing Sheets

$^1$H-NMR chemical shift assignments for polymer of Example 1 after purification by preparative GPC. (CDCl$_3$; 300 MHz)

FIG. 1

¹H-NMR chemical shift assignments for α,ω-bis (3-thiopropyltrimethoxysilane)-terminated terpolymer polymer of Example 3(b) after purification by preparative GPC. (CDCl₃; 300 MHz)

1:1 UV:Moisture dual cure (lamp on at t = 0.25, lamp off at t = 1.25 min)

CURABLE COMPOSITIONS WITH MOISTURE-CURABLE FUNCTIONALITY CLUSTERS NEAR THE CHAIN ENDS

FIELD OF THE INVENTION

The present invention is directed to polymers obtained through controlled radical polymerization with moisture-curable functional clusters near the chain ends. More specifically, the present invention is directed to polyacrylate with moisture-curable clusters located along a portion of the backbone of the polymer chain, near the chain ends.

BACKGROUND

Controlled radical polymerization (hereinafter CRP), including single-electron transfer living radical polymerization (hereinafter SET-LRP) and atom transfer living polymerization (hereinafter ATRP), is a process which produces various polymer products, in high yield, with functional, non-terminated ends, with high molecular weights, and with a low polydispersity index. Thus, CRP has been employed to design a variety of polymer products. However, these polymer products typically produced through CRP resulted in curable products with functional groups at their terminal ends.

Known CRP polymers have cure speed limitations, as well as shear modulus values which are less than desirable for many applications. Moreover, these CRP polymers have less ability to be tailored for applications requiring flexibility, thermal resistance, fluid resistance and other desirable physical and chemical properties. Thus, there exists a need for a CRP polymer with increased functionality for curing which can lead to enhanced flexibility, thermal resistance, fluid resistance, modulus shear and strength as compared to known CRP polymers.

SUMMARY OF THE INVENTION

The embodiments of the present invention solve the problems of the art, by providing a polymer product, prepared through CRP, which exhibits enhanced curing physical and chemical properties. The enhanced cure properties are achieved as a desired molar ratio of clustered curable functionalities are incorporated into the polymer chain, near or adjacent to the terminal functional ends of the chains. As such, the functional nature of the polymer at each end is maintained, but functionality overall is increased, allowing for a greater degree of crosslinking.

In another aspect of the invention there is provided a curable composition which includes a polymer having the formula $[A]_n\text{-}(A_xB_y)$, wherein A is a homo- or co-polymer or a block copolymer segment; B is a polymer segment containing at least one cluster of moisture curable groups and desirably more than one cluster and in some embodiments some segments of B may contain different functional groups, i.e. hydroxyl, epoxy, and/or alkoxy groups; $n+z(x+y)$ equals the total number of polymer units; n, x, y and z are number averages of the degree of polymerization of their respective segments to which they refer; desirably, in some embodiments $x \geq O$; $16 < z > 2$; $y > 2$; and wherein the mole % $B = y(100)/[n+z(x+y)] < 10.0$; and the mole % $A+B=(x+y)(100)/[n+z(x+y)] < 20.0$.

In yet another aspect of the invention there is provided a curable composition which includes a polymer having a formula $[A]_n\text{-}((A_xB_y)\text{-}C)_z$ wherein A is a homo- or co-polymer or a block copolymer segment; B is a polymer segment containing at least one cluster of moisture curable groups and desirably more than one cluster, and in some embodiments some segments of B may contain different functional groups, i.e. hydroxyl, epoxy, and/or alkoxy groups; C represents the last unit of the segment $(A_xB_y)$ which has been further reacted to contain a curable group such as a free radical curable group selected from, without limitation, (meth)acrylic groups, carboxylic acid groups, hydroxyl groups, alkoxy groups and combinations thereof; $n+z(x+y)$ equals the total number of polymer units; n, x, y and z are number averages of the degree of polymerization of their respective segments to which they refer; desirably, in some embodiments $x \geq O$; $16 \leq z \geq 2$; $y > 2$; and wherein the mole % $B=y/n+z(x+y)<0.1$; and the mole % $A+B=x+y/n+z(x+y)<0.2$.

A, B and C of the above formulas may be selected from any of the materials defining them respectively herein and in any useful combination.

In yet another aspect of the invention there is provided a composition which includes the controlled polymerization reaction product of: a polymerizable compound, an initiator, a ligand, a catalyst and a reactant having a cluster of moisture curing groups present, wherein the reaction product comprises a polymer chain and a cluster of reactive cites adjacent to the terminal ends of said polymer chain. Desirably, a free radical portion is also present as part of the reaction product such that the reaction product is dual curing, i.e. by moisture and free radical mechanisms.

The invention may be better understood through a study of the following figures and detailed description.

DETAILED DESCRIPTION OF THE INVENTION

For purposes of this invention, the term "(meth)acrylate" will include methacrylate and acrylate.

The term "curing", or "cure" as used herein, refers to a change in state, condition, and/or structure in a material, as well as, partial and complete curing. The term moisture curable "polymer" and "prepolymer" will be used interchangeably to mean a polymer which can be cured by moisture. The moisture curable polymer may have a variety of polymeric repeating groups or backbones.

The term "cluster" means a pendent group having at least two curable functional groups. The cluster may have more than one type of functional group on it.

The present invention relates to a novel polymer product and a process for making the same. The present invention controls the incorporation of curable clusters such that they are introduced towards the ends of the polymer chain, thereby introducing increased functionality and producing faster curing polymers, yet with workable viscosities.

The polymer product and process of the present invention may be obtained through controlled radical polymerization, including SET-LRP and/or ATRP. A controlled or living polymerization process is one in which chain transfer and termination reactions are essentially nonexistent relative to the polymer propagation reaction. These developments have led to the production of polymers that exhibit precise and quantitative functionality and to the development of functional polymers that possess specific chemical reactivity. The methods of the present invention extend the level of control available to materials engineers in processing polymers and using polymers as building blocks in, or components for, subsequent material forming reactions, such as copolymerizations, chain extensions and crosslinking reactions, and interaction with substrates, including dispersed solids.

There has been a continuing effort to make the controlled radical polymerization as environmentally benign and as low cost a process for the preparation of functional materials as possible. Factors such as control over the polymer molecular weight, molecular weight distribution, composition, architecture, and functionality are important considerations in the design and execution of such methods. The methods of the present invention allow for greater control over the final polymer products such that the desired chain length, polydispersity, molecular weight, and functionality are easily incorporated into the final product. Thus, the present invention overcomes the poor control over molecular weight distribution, low functionality, polymer rheology, and undesirable polydispersity. Also, because the inventive process is controllable, it can be implemented on a large scale with increased predictability, allowing for tailoring of properties of the final polymer products, and enhanced formulations on these properties. Further, because the inventive process results in less termination during polymer formation, the resultant polymer structures are more precise. Moreover, as very low levels of catalyst are needed to drive the reaction, purification of the final product is facilitated, and at times, unnecessary. Further, components used in the inventive process may be optimized to provide even more precise control over the (co)polymerization of monomers.

The method of the present invention allows for a single pot SET-LRP controlled radical polymerization product to be end-functionalized in a manner that provides increased benefits for curing. The resulting polymer may have functionalized clusters along or otherwise near the polymer chain ends of the polymer, in addition to other functional terminal groups also present.

The polymer product prepared through SET-LRP may be reacted in such a way that pendant curable, including moisture-curable functionalities, may be introduced in clusters near the ends of the polymer chain. As such, the terminal end groups, which desirably may be functional, of the resultant polymer remain intact while further providing cluster functionality. The resulting functional polymers of the present invention may then be formulated into moisture-cure compositions. These moisture-cure compositions may exhibit superior cure time, as well as other advantageous and desirable characteristics. Successful cure was completed through ambient moisture, as demonstrated through rheometry measurements in the Examples provided herein.

An aspect of the present invention includes a process of controlled radical polymerization. The process includes the steps of: performing controlled radical polymerization on a polymerization compound with an initiator, a ligand, and a catalyst; permitting the polymerization to proceed until a desired level of conversion is attained; and further reacting the intermediate polymerization compound with a reactant having multiple reactive sites to provide a curable reaction product having a cluster of the multiple reactive sites adjacent to the terminal ends of a polymer product. In some embodiments, the desired level of conversion is prior to complete conversion. In other embodiments, the desired level of conversion is substantially complete conversion, for example 98% or more conversion. The resultant curable polymer may have one or more pendant moisture-curable functionalities as part of the cluster. Additionally, reactive groups, such as moisture curable and/or free-radical curable groups, may also be present as terminal groups.

The polymerization compound used in the invention may be selected from one or more of a monomer, a copolymer, a block copolymer, and combinations thereof, as may be desired. Suitable monomers include acrylates, halogenated acrylates, methacrylates, halogen-substituted alkenes, acrylamines, methacrylamides, vinyl sulfones, vinyl ketones, vinyl sulfoxides, vinyl aldehydes, vinyl nitriles, styrenes, and any other activated and nonactivated monomers containing electron withdrawing substituents. These monomers may be substituted and/or may optionally contain functional groups that assist in the disproportionation of the catalyst into other oxidation states. Functional groups may include without limitation, amide, sulfoxide, carbamate, or onium. Halogen substituted alkenes include vinyl chloride, vinylidene chloride, vinyl fluoride, vinylidene fluoride, trilluoroethylene, trifluorochloroethylene, or tetrafluoroethylene, hexafluorpropylene and fluorinated vinyl esters. Combinations of the monomers, copolymers and block copolymers may be used.

Specifically, the monomer may be one or more of for example, alkyl (meth)acrylates; alkoxyalkyl (meth)acrylates; (meth)acrylonitrile; vinylidine chloride; styrenic monomers; alkyl and alkoxyalkyl fumarates and maleates and their half-esters, cinnamates; and acrylamides; N-alkyl and aryl maleimides (meth)acrylic acids; fumaric acids, maleic acid; cinnamic acid; and combinations thereof.

More specifically, the monomers used to create polymers with the embodiments of the present invention are not limited to any particular species but includes various monomers, for example: (meth)acrylic acid monomers such as (meth)acrylic acid, methyl(meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, -(methacryloyloxypropyl)trimethoxysilane, meth)acrylic acid-ethylene oxide adducts, trifluoromethylmethyl (meth)acrylate, 2-tri fluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylethyl (meth)acrylate, 2-perfluorohexylethyl (meth)acrylate, 2-perfluorodecylethyl (meth)acrylate and 2-perfluorohexadecylethyl (meth)acrylate; styrenic monomers such as styrene, vinyltoluene, alpha-methylstyrene, chlorostyrene, styrenesulfonic acid and salts thereof; fluorine-containing vinyl monomers such as perfluoroethylene, perfluoropropylene and vinylidene fluoride; silicon-containing vinyl monomers such as vinyltrimethoxysilane and vinyltriethoxysilane; maleic anhydride, maleic acid, maleic acid monoalkyl esters and dialkyl esters; fumaric acid, fumaric acid monoalkyl esters and dialkyl esters; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile-containing vinyl monomers such as acrylonitrile and methacrylonitrile; amido-containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; vinyl chloride, vinylidene chloride, allyl chloride, allyl alcohol, etc. The aforementioned monomers may be used singly, sequentially, or in combination. From the desirability of physical properties of products, one or more classes of monomer may be desired.

Polymers and/or copolymers of these monomers, and the like, as may be desired, are also contemplated as employable with the present process. The polymerization compound is polymerized in a controlled radical polymerization process, including by SET-LRP and/or ATRP methods, with other components, including: an initiator, a ligand, a catalyst, and optionally a solvent, in order to build the polymerization compound into a polymerization product, or curable polymer end-product.

Initiators of the present method may initiate the free radical reaction and thusly, may be considered as contributors to the number of growing polymer chains. Suitable initiators include, for example, halogen containing compounds. Examples of initiators include chloroform, bromoform, iodoform, carbon tetrachloride, carbon tetrabromide, hexahalogenated ethane, mono-di, and tri haloacetates, acetophenones, halogenated amides, and polyamides such as nylons, halogenated urethanes and polyurethane including their block copolymers, RO halogenated imides, acetone, and any other initiators shown to work with conventional metal catalyzed living radical polymerization including ATRP and SET-LRP. A wide variety of initiators are suitable for use in the present invention. Halogenated compounds are particularly suited for use in the invention. These initiators include compounds of the formula R—X or "R'C(=O)OR" where X is a halogen and R is $C_1$-$C_6$ alkyl. For example, the initiator may include: diethyl meso-2,5-dibromoadipate; dimethyl 2,6-dibromoheptanedioate, ethylene glycol bis(2-bromopropionate); ethylene glycol mono-2-bromopropionate; trimethylolpropane tris(2-bromopropionate); pentaerythritol tetrakis (2-bromopropionate); 2,2-dichloacetophenone; methyl 2-bromopropionate; methyl 2-chloropropionate; N-chloro-2-pyrrolidinone; N-bromosuccinimide; polyethylene glycol bis(2-bromopropionate); polyethylene glycol mono(2-bromopropionate); 2-bromopropionitrile; dibromochloromethane; 2,2-dibromo-2-cyanoacetamide; α,α'-dibromo-ortho-xylene; α,α'-dibromo-meta-xylene; α,α'-dibromo-para-xylene; α,α'-dichloro-para-xylene; 2-bromopropionic acid; methyl trichloroacetate; para-toluenesulfonyl chloride; biphenyl-4,4'-disulfonyl chloride; diphenylether-4,4'-disulfonylchloride bromoform; iodoform carbon tetrachloride; and combinations thereof. In some embodiments, the initiator may be an alkyl, sulfonyl, or nitrogen halide. The nitrogen halide can be also halogenated nylon, peptide, or protein. Alternatively, a polymer containing active halide groups, for example, poly(vinylchloride), the chloromethyl group of polychloromethylsytrene and other such polymers and copolymers can also be used as initiators.

Useful ligands in the present invention generally include a nitrogen-containing ligand which may aid in the extraction of the catalyst to the extent that the metal catalyst may be solubilized by the ligand, so it is available in its higher oxidation state. Thus, the ligand may desirably drive the polymerization reaction to the effect that it may aid in promoting a mixture of the various components of the reaction mixture on a molecular level. A wide variety of nitrogen-containing ligands are suitable for use in the present invention. These compounds include primary, secondary, and tertiary alkyl or aromatic amines, as well as polyamines which may be linear, branched, or dendritic polyamines and linear, branched, or dendritic polyamides. Suitable ligands for use in the present invention include ligands having one or more nitrogen, oxygen, phosphorus and/or sulfur atoms which can coordinate to the transition metal through a sigma-bond, and ligands containing two or more carbon atoms which can coordinate to the transition metal through a pi-bond. For example, suitable ligands may include tris(2-dimethylaminoethyl)amine (Me6-TREN), tris(2-aminoethyl)amine (TREN), 2,2-bipyridine (bpy), N,N,N,N,N-pentamethyldiethylenetriamine (PMDETA), and as well as other N-ligands.

The ligand may desirably form a soluble complex with the redox conjugate of the transition metal, i.e. the higher oxidation state of the transition metal, forming a complex that is active, i.e. participates in the deactivation of the growing radical chain, which may contribute to a more narrow molecular weight distribution of the resulting polymer product thus formed.

Useful catalysts include, without limitation: Cu(0); $Cu_2S$; $Cu_2Te$; $Cu_2Se$; Mn; Ni; Pt; Fe; Ru; V; and combinations thereof, and the like, as is known in the art. Similarly, other catalysts, including, for example, Au, Ag, Hg, Rh, Co, Ir, Os, Re, Mn, Cr, Mo, W, Nb, Ta, Zn, and compounds including one or more thereof may be employed with the present methods. One particularly effective catalyst is elemental copper metal, and its derivatives. The catalyst may take one or more forms. For example, the catalyst may be in the form of a wire, mesh, screen, shavings, powder, tubing, pellet, crystals, or other solid form. The catalyst surface may be one or more of a metal, as previously disclosed or metal alloy. Desirably, the catalyst is copper or a copper transition metal in one or more forms provided above. Most desirably, the catalyst is in the form of a copper screen used in the vessel external to the reactor, as described in co-owned U.S. copending application PCT/US2009/047579, filed Jun. 17, 2009, which is incorporated herein by reference in its entirety.

Optionally, a solvent may be included with the present invention in order to, for example, reduce viscosity of the reaction mixture, increase conversion of the ligand, and/or promote fast disproportionation of the catalyst in order to facilitate ultrafast polymerization. Further, the solvent in intended to be non-reactive in order to prevent chain transfer, side reactions, or poisoning of the catalyst. Desirable solvents of the present methods include dipolar, protic, or aprotic solvents. Some desired solvents include water, alcohol, natural or synthetic polymeric alcohols, dipolar aprotic solvents, ethylene carbonate, propylene carbonate, ionic liquid, or a mixture thereof. For example, such solvents may include: ethylene glycol, diethylene glycol, triethylene glycol, 2-(2-ethoxyethoxy)ethanol, tetraethylene glycol, glycerine, hydroxyethyl(meth)acrylate (HEMA), phenols, dimethylsulfoxide (DMSO), dimethylforamide (DMF), dimethylacetamide (DMAc), N-methyl-2-pyrrolidone (NMP), ionic liquids, ethylene carbonate, and propylene carbonate. Suitable alcohols include methanol, ethanol, propanol, isopropanol, butanol, and tert butanol, and other natural and synthetic polymers containing OH groups. Desirably, the solvent or solvent blend chosen does not cause precipitation of the polymer product during the reaction.

The controlled radical polymerization reaction may be completed under an inert atmosphere to prevent side reactions and/or oxidation of the reaction medium by the oxygen present in the air. Suitable gases to purge the reaction vessel and/or control volume include, for example, argon and nitrogen. It may also be desirable to control the reaction temperature in order to promote certain reaction conditions. Low temperatures, including 5°, 10°, 15°, or 20° C. may be maintained through the use of jackets, water baths, heat converters, and the like. Similarly, higher temperatures closer to room temperature 50°, 60°, or 70° C. may also be maintained through the use of the aforementioned equipment. It is also possible to complete the polymerization process at higher temperatures, i.e. about room temperature, or, at 80°, 100°, 150°, etc, ° C., as may be desired.

The intermediate polymerization product generally refers to the final polymer reaction product in an intermediate phase, as the controlled radical polymerization is progressing, but prior to completion. It is possible to monitor the conversion of the polymer product through various means and instrumentation, including for example: FTIR, NMR, GPC, IR, Spectrophotometry, HPLC, and the like, as may be desired, in order to test as may be desired the level of conversion of the reaction process. Desirably, small samples may be withdrawn from the controlled radical polymerization process in order to complete IR testing on the reaction mixture to determine the level of conversion. IR may be used to detect chain length, and amounts of unreacted polymerization compound (e.g. monomer) in a sample.

Once a desired level of conversion is reached in the intermediate polymerization compound, it is possible to add to the reaction mixture a reactant having multiple reactive sites. The reactant with multiple reactive sites may generally be referred to as a compound with at least two, but desirably more than two functional groups, where the functional groups have characteristically advantageous cure properties, including moisture and/or UV cure properties. Thus, the composition with multiple reactive sites may generally include a polymerization compound with multiple curable functional groups thereon.

Thus, as the controlled radical polymerization reaction proceeds, there is an intermediate polymerization product formed in situ, in addition to unreacted (not yet reacted) polymerization product. Once the desired intermediate polymerization product is formed, based on the desired level of conversion of starting material to polymer product, the reactant containing multiple i.e., a cluster of, reaction sites is added for the purpose of incorporating the reactant as a pendent group, whereby the remaining multiple reaction sites provide curable functional groups. This pendent group is not intended to be distinct from the terminal end group of the final polymer reaction product, i.e., it is not the terminal end product but a pendent group proximal thereto. The terminal groups of the final polymer reaction product are, however, desirably also curable groups.

Among the curable reactive groups employed on the cluster and/or as the terminal end group include, without limitation hydroxyl, alkoxy, amino, isocyanate, vinyl, (meth) acrylic, epoxy and carboxy groups. Combinations of these groups may also be included. These groups may be present as terminal functional groups and/or as pendent cluster groups. The curable reactive groups may be curable, for example, via moisture curing and/or free radical mechanisms. Desirably, the final polymer reaction product is a polymer formed via controlled free radical polymerization, having moisture curing groups both at the terminal ends, as well as at the pendent cluster proximal to the terminal ends, and desirably also includes a uv-curable portion as well, such that a dual curing polymer is formed.

It should also be noted that it is also possible that after the desired level of conversion is reached, for example complete or nearly complete conversion of the reactants into the final polymer product, a further mixture of additional polymerization compound in combination with the reactant having the cluster of reactive sites on it be then added. This further mixture may be pre-formed in order to add known molar ratios of each to the polymer product having a desired chain length.

In the inventive process, it is desirable that the pendent cluster of reactive sites (curable functional groups) on the reactant remain intact and active as the compositions are incorporated onto the polymer chain. The composition with the cluster of reactive sites may be selected in order to promote the continued controlled radical polymerization process towards conversion, while avoiding premature termination of the chain ends. It is possible to select the amount of reactant containing multiple reactive groups such that a desired amount of functionality may be added to the final polymerizable compound. In forming the compositions of the present invention, the Segment A (referred to above) is first made to a desired degree of conversion. Then the second monomer unit B is added. The reaction proceeds such that B and any unreacted monomer (or reactant) which formed segment A are added to the polymer chain in random fashion. The addition of B and unreacted A to the polymer chain will be near and/or at the end of the polymer chain thus formed. In this manner the chain ends are enriched with reactive groups relative to the mid-chain segments of the polymer thus formed.

The pendent group(s) incorporated proximal to and/or at the terminal ends of the final polymer reaction product may be referred to as "clustered functional groups", "clusters of cross-linkable groups" or "clusters of pendant curable groups" interchangeably. The molar ratio of polymerizable compound (A) to the reactant containing the clustered functional groups may be any molar ratio that desirably does not adversely affect the desired mechanical properties of the final polymer product. For example, it is contemplated by the present inventors that the reactant with clustered functional groups (B) may be from 5% to about 100% of a "clustered" length of the $(A_xB_y)$ block, where x and y are used as defined later herein. Desirably, the percentage of reactant containing clustered functional groups is about 1% to about 50% by weight of the $(A_xB_y)$ block. More desirably, the percentage of reactant containing clustered functional groups is about 5% to about 35% by weight of $(A_xB_y)$ block. Also, the clustered functional groups pendent on the polymer chains are desirably located along the polymer chain at or proximal to the terminal ends of the polymer chains. Thus, the final polymer reaction products having clusters of cross-linkable functional groups towards their ends will exhibit superior cure characteristics due to the greater potential for controlled crosslinking.

In the present invention, permitting the polymerization to proceed includes allowing the polymerization to continue, such that the total percentage of conversion is increased. Also, "permitting" may include optimizing the parameters of the polymerization process in order to promote the continued polymerization process, while limiting side reactions, non-functional end termination, and the like. In such a manner, "permitting polymerization to proceed" will allow the polymer to build a chain, from a center region outward, away from the center of the polymer molecule. The polymerizable compound, as it proceeds through the controlled radical polymerization, desirably results in terminal functionality in addition to pendent functionality. The controlled radical polymerization may proceed according to the generally accepted mechanisms of an atom transfer radical polymerization process, a single electron transfer living radical polymerization, or combinations thereof.

The final polymer reaction product may include a polymer product with clustered curable functional groups near, or at, the ends of the polymer chains. Desirably, the functional groups contribute to increased cross-linking and more controlled curing, e.g., more rapid curing, of the polymer product. It is also desirable that the clustered curable functional groups promote the aforementioned characteristics while maintaining and/or enhancing the mechanical properties of the final polymer reaction product.

The final polymer reaction products of the present invention may be used for a variety of applications, including, without limitation, as adhesives, sealants, potting compositions, retaining compositions and coatings. One particularly useful application is as contact adhesives with a prolonged tack retention period, yet maintaining their final adhesive properties once fully cured. The polymers of the invention also exhibit excellent oil resistance, heat resistance, adhesiveness and flexibility, and have many applications in the automotive, electronic, consumer and general industrial areas.

Another aspect of the present invention provides a curable composition comprising the formula: $[A]_n$–$((A_xB_y)$–$C)_z$ wherein A is a homo- or co-polymer or a block copolymer segment; B is a polymer segment containing at least one cluster of moisture curable groups and desirably more than one cluster, and in some embodiments some segments of B may contain different functional groups, i.e. hydroxyl, epoxy, and/or alkoxy groups; C represents the last unit of the segment $(A_xB_y)$ which has been further reacted to contain a curable group such as a free radical curable group selected from, without limitation, (meth)acrylic groups, carboxylic acid groups, hydroxyl groups, alkoxy groups and combinations thereof; n+z(x+y) equals the total number of polymer units; n, x, y and z are number averages of the degree of polymerization of their respective segments to which they refer; desirably, in some embodiments $x \infty 0$; $16 \leqq z \geqq 2$; $y > 2$; and wherein the mole % B=y/n+z(x+y)<0.1; and the mole % A+B=x+y/n+z(x+y)<0.2.

A, B and C may be selected from any of the foregoing components described herein as polymerization components and reactive cluster-containing components, respectively, as well as in any combination.

Thus, the polymerizable compositions produced by the present invention may include both clusters of moisture curable groups at or near the end(s) of the polymer chain, which moisture curable groups may be the same of different on the polymer chain, as well as also incorporating other curable groups such as free radical curing groups near or at the end(s) of the polymer chain, such as those referred to above, and particularly (meth)acrylic groups. The curable compositions may be the product of controlled radical polymerization, including but not limited to: ATRP, SET-LRP, and combinations thereof.

Segment A may be selected from one or more of at least one monomer, at least one polymer, at least one (co)polymer, and combinations thereof. For example, A may include a polymer segment and/or a length of polymer backbone composed of one or more of the aforementioned, as may be desired. Segment A may be formed from any of the aforementioned monomers, polymers or copolymers useful in the inventive process.

Segment B may further include a polymer segment having clusters of functional groups dispersed along a portion of its polymer chain, wherein B is different from A. Alternatively, B may include a polymer chain having clustered functional groups dispersed along a portion of its polymer chain, wherein the polymer chain of B is the same as A. It is desirable that the curable functionalities of B do not adversely affect the mechanical properties of the final curable polymer, but rather, enhance the mechanical properties. Desirably, the molar ratio of A:B may be from about 0.01:to about 1, to about 1,000:to about 1. As an example, poly butyl acrylate (PBA) may be polymerized using the SET-LRP process. Once the PBA is measured during the polymerization reaction to have reached a desired level of conversion, a functionalized acrylate may be added to the reaction mixture, thus providing a certain molar ratio of reactant with multiple reactive sites to polymerizable compound. One example of a functionalized reactant with multiple reactive sites may include, for example, a 3-(trimethoxysilyl) propyl methacrylate.

Segment C may further include a terminal end group of the curable composition. Desirably, C includes curable end groups. Terminal Segment C may be placed onto the chain ends of the final polymer reaction product by end-capping or a substitution reaction, as may be desired. Suitable terminal groups on the polymerization compound may include without limitation: (meth)acryloxyalkyltri(alkoxy)silane, (meth)acryloxyalkyldialkoxysilane, as well as the curable groups mentioned previously herein.

A and B may be selected from any of the foregoing components described herein as the polymerization components and reactive cluster-containing components, respectively.

The final polymerizable reaction products and their compositions may be moisture curable, UV-curable, and combinations thereof.

The adhesive compositions of the present invention are capable of curing in the presence of moisture at room temperature. Desirably, the compositions described herein are sufficiently cured at about 4 to about 8 hours after application. Further, the compositions described herein are fully cured after about 48 to about 72 hours.

As an exemplary reaction scheme n-butyl acrylate was polymerized through SET-LRP with a difunctional initiator used to initiate the reaction. The polymer grew from the center out. Once a predetermined level of conversion was reached, e.g. 50-100% conversion and desirably 80-99% conversion of monomer to polymer, a polyacrylate having clustered functionality was added to the reaction mixture. Polymerization continued, incorporating the clustered polyacrylate functionality into the polymer chain at or near the terminal ends of the final polymer reaction product, until the conversion was complete.

EXAMPLE 1

Synthesis of poly(n-butyl acrylate) with Concentrated Enrichment of Chain Ends by trimethoxysilane Groups Scheme 1. Two-step sequential polymerization of butyl acrylate and 3-(trimethoxysilyl)-propyl methacrylate under controlled radical polymerization conditions (SET—LRP).

To an argon swept 500-mL jacketed glass reactor fitted with a stainless steel propeller blade and shaft, dry-ice condenser, thermocouple, ATR infrared (IR) detector probe and argon purge line was added n-butyl acrylate (248.16 g; 1.94 moles), copper powder (0.174 g; 2.74 millimoles, <10 μm particle size), tris[2-(dimethylamino)ethyl]amine (0.63 g; 2.73 millimoles) (Me$_6$-TREN; prepared as described by M. Ciampolini, Inorg. Chem. 1966, 5 (1), 41) and anhydrous methanol (110 g). The mixture was cooled to 5° C. and degassed under vacuum at 50 torr for 10 minutes. The vacuum was released under argon and the vacuum degassing cycle repeated. Powdered diethyl meso-2,5-dibromoadipate (4.94 g; 13.73 millimoles) was then added to the stirred mixture under positive pressure of argon. The reactor was vacuum degassed as already described and the mixture than heated to 35° C. A mild exotherm was observed as the temperature reached a maximum of 48° C. and the solution developed a green color. The mixture was cooled to 20° C. over the next 20 minutes, at which time, conversion of monomer was 96% (IR analysis). The mixture was stirred for an additional 3 hours, at which time the monomer was essentially consumed (99% conversion). 3-(Trimethoxysilyl)propyl methacrylate (16.63 g; 0.067 moles) was added and the mixture stirred for 16 hours at 20° C. Addition copper powder (0.061 g; 0.96 millimoles) and Me$_6$-TREN (0.30 g; 1.30 millimoles) were added and the mixture stirred for an addition 6 hours, at which time the consumption of methacrylate was estimated to be 60%. The crude polymer solution was diluted with tetrahydrofuran (THF) (500 g) and filtered through two beds of neutral alumina (200 g each) under an atmosphere of dry nitrogen. The solvents and residual monomers were removed by distillation under vacuum (3.5 hours, 70° C. 650 millitorr) to give the trimethoxysilyl end enriched polymer (193.93 g; 73% recovered yield) (Scheme 1).

Analyses of poly(n-butyl acrylate) with trimethoxysilane-Enriched Chain Ends

The IR spectrum of the monomer has an isolated absorbance band at about 810 cm$^{-1}$, due to the acrylate double bond. This absorbance, which scales directly with monomer concentration (Beer-Lambert Law), is not present in the polymer. The degree of monomer conversion can thus be determined at any time during the reaction by comparing the absorbance at that time to the original absorbance, i.e. % Conversion=100(1−A$_1$/ A$_0$), where A$_1$ is absorbance measured during or after the reaction and A$_0$ is initial absorbance before polymerization has begun.

The polymerization was conducted in two sequential steps. Firstly, butyl acrylate (BA) was polymerized to 99% conversion under controlled radical polymerization conditions (SET-LRP) to yield a dibromo-terminated macroinitiator. 3-(Trimethoxysilyl)propyl methacrylate (TMSPMA) was then added to the solution of macroinitiator and residual butyl acrylate (BA; 1% or 0.02 moles of original amount) and a copolymerization of TMSPMA and BA was conducted in a second step until no further conversion of monomers was detected by IR analysis (Scheme 1). The resulting polymer has, therefore, a binary triblock structure (Q-T-Q) composed of a center segment of poly(n-butyl acrylate) and two end-segments composed of poly[3-(trimethoxysilyl)propyl methacrylate-co-n-butyl acrylate]. T corresponds to [A]$_n$ in the generic formula and Q corresponds to (A$_x$B$_y$) in the generic formula recited herein. The relative proportions of T to Q blocks is determined from the fraction of BA consumed in the first stage (99% of 1.94 moles=1.92 moles) to the amount of combined monomers consumed in the second stage (60% of 0.086 moles=0.05 moles)(0.067 moles TMSPMA+0.019 BA), i.e. 1.92/0.05 or 38.4 (see NMR data below). Assuming TMSPMA and BA are consumed in equal proportions during the second stage, the copolymer composition of the end blocks is thus 78% TMSPMA and 22% BA. The polymer structure has therefore a concentrated enrichment of TMSPMA groups located in the end segments (see NMR below).

The molecular weight and polydispersity of the polymer were determined by GPC analysis (THF solution, RI detector; PMMA standards) and found to be 24,100 (number average, Mn) and 1.09 respectively. The expected molecular weights of each segment were calculated according to the relationship $$\overline{Mn} = MW_M \left( \frac{[M]_0}{[I]_0} \right)(f_{conv}) + MW_I$$

where Mn is the number average molecular weight of the polymer segment, $MW_M$ is molecular weight of monomer (first stage) or weighted average molecular weight of combined monomers (second stage) $[M]_0$ and $[I]_0$ represent the initial molar concentrations of monomer(s) and initiator respectively (diethyl meso-2,5-dibromoadipate in first stage; macroinitiator in second stage), $f_{conv}$ is fractional conversion (0.99 and 0.60 in first and second steps respectively) and $MW_I$ is the molecular weight of the initiator or macroinitiator. Accordingly, the molecular weight of poly(n-butyl acrylate) in the center segment of the polymer was 18,300 and the molecular weight of the combined end-segments was 800 (400 for each segment). The total expected molecular weight for the end-capped polymer is thus 19,100. As the weighted average molecular weight of the monomer blend in the second step is 211 [i.e. 128(0.22)+234(0.78)], the end blocks have on average two monomer units (dimers) each with an average of 1.5 alkoxysilane units per end.

The number average degrees of polymerizations ($DP_n$), which define the average number of repeat units in the polymer backbone are estimated according to the formula $$\overline{DP}_n = \frac{[M]_0}{[I]_0}(f_{conv})$$

Accordingly the poly(n-butyl acrylate) center segment has a $DP_n$ value of 140 repeat units whereas the silane enriched end segments have $DP_n$ of about 3.8. As 78% of end segments are derived from TMSPMA, and as the chain is linear (i.e. two ends) the average number of trimethoxysilane groups per chain end is approximately 1.5[i.e. 3.8(0.78)/2] and the ratio of BA repeat units to silane end groups is about 47 (i.e. 140/3.0).

Since the measured and calculated molecular weights are similar in values and the molecular weight distribution is close to the theoretical limit of 1.01(1+1/DP), it can be concluded that the reaction occurred by a controlled living radical polymerization mechanism and that the trimethoxysilane groups were concentrated on the polymer ends during the second polymerization stage.

Figure 1:
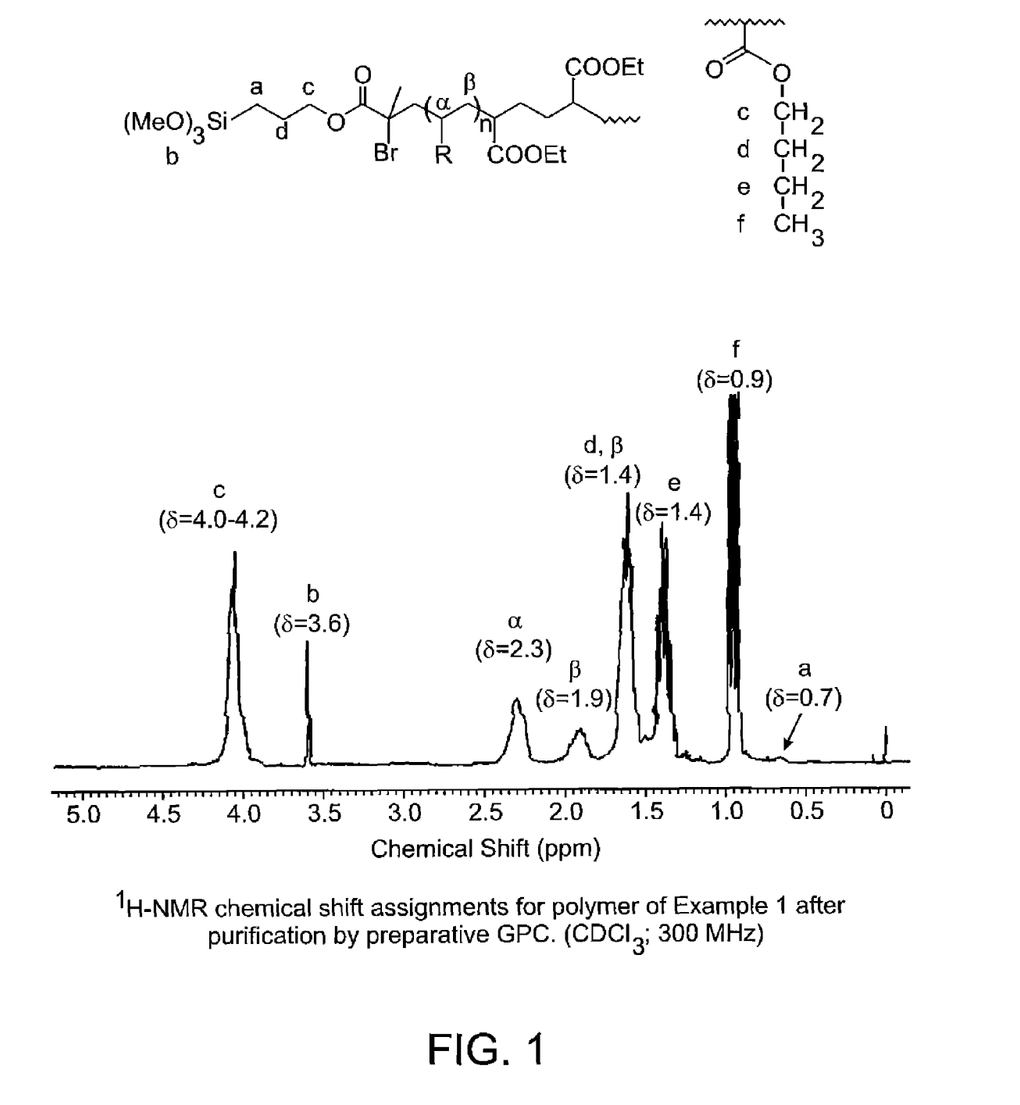
FIG. 1 is a graph of an NMR analysis confirming the polymer structure of Example 1.

The structure of the polymer was confirmed by $^1$H NMR analysis (FIG. 1: H-NMR chemical shift assignments for polymer of Example 1 after purification by preparative GPC. (CDCl$_3$; 300 MHz). A small aliquot (~50 mgs) was first purified by preparative gel permeation chromatography (prep. GPC) to ensure that there was no contamination of the polymeric material by residual low molar mass constituents. The spectra before and after Prep GPC were almost identical, indicating that no significant or measurable amounts of acrylate or methacrylated monomers were present after the final solvent distillation. The spectrum shows characteristic signals for trimethoxysilyl at δ 3.6 and methylene adjacent to silicon at δ 0.7. These signals can only be attributed to polymer-bound alkoxysilane groups and indicate that end-functionalization of the intermediate first stage polymer (macroinitiator) by TMSPMA has occurred during the second stage reaction. By comparing the integration of signals due to trimethoxysilane end groups (signal b; δ 3.6) to that of signal corresponding to —OCH2- in the ester side chain of the poly(n-butyl acrylate) units (signal C; δ 2.3) the mole ratio of BA/TMSPMA units is 42. This result corresponds very closely to the value of 47 determined from the stoichiometric considerations and IR analysis as describe above.

The combined spectroscopic and chromatographic analyses confirm the structure of the copolymer as an end-enriched triblock having a long center-segment of poly(n-butyl acrylate) with approximate molecular weight of 18,300 and two short end-segments, each having an approximate molecular weight of 400 and an average of 1.5 trialkoxysilane groups per segment.

EXAMPLE 2

Synthesis of poly(n-butyl acrylate) with Dilute Enrichment of Chain Ends by trimethoxysilane Groups To an argon swept 500-mL jacketed glass reactor fitted with a stainless steel propeller blade and shaft, dry-ice condenser, thermocouple, ATR infrared (IR) detector probe and argon purge line was added n-butyl acrylate (248.16 g; 1.94 moles), copper powder (0.174 g; 2.74 millimoles, <10 μm particle size), tris[2-(dimethylamino)ethyl]amine (0.63 g; 2.73 millimoles) (Me$_6$-TREN) and anhydrous methanol (110 g). The mixture was cooled to 5° C. and degassed under vacuum at 50 torr for 10 minutes. The vacuum was released under argon and the vacuum degassing cycle repeated. Powdered diethyl meso-2,5-dibromoadipate (4.94 g; 13.73 millimoles) was then added to the stirred mixture under positive pressure of argon. The reactor was vacuum degassed as already described and the mixture then slowly heated to 35° C. over a period of about one hour. An exotherm was observed as the temperature reached a peak of 66° C. and the solution developed a green color. The mixture was cooled to 50° C. over the next 30 minutes, at which time, conversion of monomer was estimated to be 90% (IR analysis). 3-(Trimethoxysilyl)propyl methacrylate (17.94 g; 0.072 moles) was added and the mixture stirred for 3 hours at 50° C., at which time the combined consumption of methacrylate and residual acrylate were estimated to be 60%. Methanol was partially removed from the crude reaction mixture by distillation under reduced pressure (20 minutes, 450 mbar, 75° C.) and the resulting solution diluted with tetrahydrofuran (THF) (about 1 L). The diluted solution was filtered through two beds of neutral alumina (200 g each) under an atmosphere of dry nitrogen. The solvents and residual monomers were removed by distillation under vacuum (3.0 hours, 75° C. 650 millitorr) to give the trimethoxysilyl end enriched polymer (202 g; 76% recovered yield) (Scheme 1).

The structure and composition of the polymer was confirmed by GPC and 1HNMR analyses as already described in Example 1. From the reaction stoichiometry and IR analysis, the degree of end enrichment by silane groups was estimated to be 27%. Molecular weight of center poly(n-butyl acrylate) was estimated to be 16,600 and the combined molecular weights of the two end segments was 2,500 giving a total polymer molecular weight of 19,100, similar to that of Example 1. GPC analysis showed average Mn of polymer to be 22,600 and polydispersity of 1.07 relative to poly(methyl methacrylated) standards. The degree of polymerization of center segment was estimated to be 127 and that of the ends to be 6 in each end-segment. The average number of trimethoxysilane groups (functionality) in each end segment is therefore approximately 1.6 [i.e. 6(0.27)] and the mole ratio of BA/TMSPMA is 42. This value is very close to the value of 38 as determined from the 1HNMR spectrum of the polymer purified by preparative chromatography as described in Example 1.

EXAMPLE 3

Synthesis of di-functional 5/3/2 of ethyl acrylate (EA)/2-methoxyethyl acrylate (MEA)/butyl acrylate (BA) terpolymer with thiopropyltrimethoxysilane ether End Groups (a) Synthesis of Intermediate Dibromo-Terminated Terpolymer

To a 3-L jacketed polymerization reactor fitted with a dry-ice condenser, mechanical stirrer, thermocouple, FTIR probe, argon purge, inlet port with rubber septum and vacuum line and modified with an external catalyst chamber connected to the reactor by means of a peristaltic pump was added ethyl acrylate (854.4 g; 8.53 moles), 2-methoxyethyl acrylate (666.3 g; 5.12 moles); n-butyl acrylate (437.5 g; 3.41 moles), dimethyl sulfoxide (541.5 g) and tris[2-(dimethylamino) ethyl]amine (1.356 g; 5.89 millimoles). The reaction mixture was stirred and cooled to 5° C. and a roll of copper gauze (30×30 screen; 33.4 cm×15.4 cm×0.03 cm) was placed in the catalyst chamber. The monomer solution was deoxygenated by vacuum degassing (45 minutes at 20 torr) and purging with argon (26 mL/minute). Diethyl-meso-2,5-dibromoadipate (42.38 g; 0.118 moles) was added to the reaction mixture, dissolved and the deoxygenation step repeated. The contents of the reactor were then pumped continuously through the catalyst chamber at a rate of approximately 500 mL/minute. After 70 minutes of pumping, an exotherm was observed as the reaction temperature in the reactor increased to 24° C. and then subsided. The temperature increase corresponded to a reduction in IR absorbance due to acrylate double bonds and an increase in the solution viscosity. The pumping rate was reduced to 200 ml/minute and the reaction mixture warmed to 20° C. After 11 hours, the monomer conversion was found to be >99% (disappearance of absorbance band at 1635 cm$^{-1}$ in IR spectrum) and the reactor was vented to atmosphere. The crude polymer solution was diluted dichloromethane (2 L) and filtered through a bed of neutral alumina (1 kg) to remove solubilized copper salts. The filter bed was flushed with dichloromethane (1 L) and the combined filtrates were extracted with water (6×600 mL portions) to remove DMSO from the mixture and dried over activated molecular sieves and anhydrous magnesium sulfate. The desiccants were removed by filtration and the solvent by distillation under reduced pressure to yield dibromo-terminated polyacrylate terpolymer with composition corresponding to proportions of monomers in the original feed as a colorless viscous liquid (1.8 kg; 90% recovered yield). The structure and composition of the product were confirmed by infrared and $^1$H NMR spectroscopy and size exclusion chromatography (SEC) as outlined below.

IR (ATR mode): IR confirms peaks @~1661 cm$^{-1}$ and ~1637 cm$^{-1}$ associated with the acrylate double have been consumed.

$^1$H NMR (300 MHz; CDCl$_3$): δ 4.28, t, shoulder on δ 3.90-4.30 [—CH(COOR)Br]; δ 3.90-4.30, 350H (—OCH$_2$-); δ 3.53, m, 103H (—CH$_2$OMe); δ 3.32, s, 148H (—OCH$_3$); δ 2.29, broad m, 178H {backbone α-methine [(—CH(COOR)CH$_2$]$_n$}; δ 1.26-1.97, m; {backbone β-methylene [(—CH(COOR)CH$_2$]$_n$, —CH$_2$CH$_2$— butyl and adipate}; δ 1.21, t, (—CH$_3$ ethyl); δ 0.90, t, 92H SEC (THF; 1 mL/min; RI detector): average M$_n$(PMMA calibration)=20,000; polydispersity=1.2 (monomodal distribution); M$_n$(theory)=17,000

(b) Synthesis of propyl trimethoxysilane-Terminated 5/3/2 EA/MEA/BA terpolymer

Figure 2:
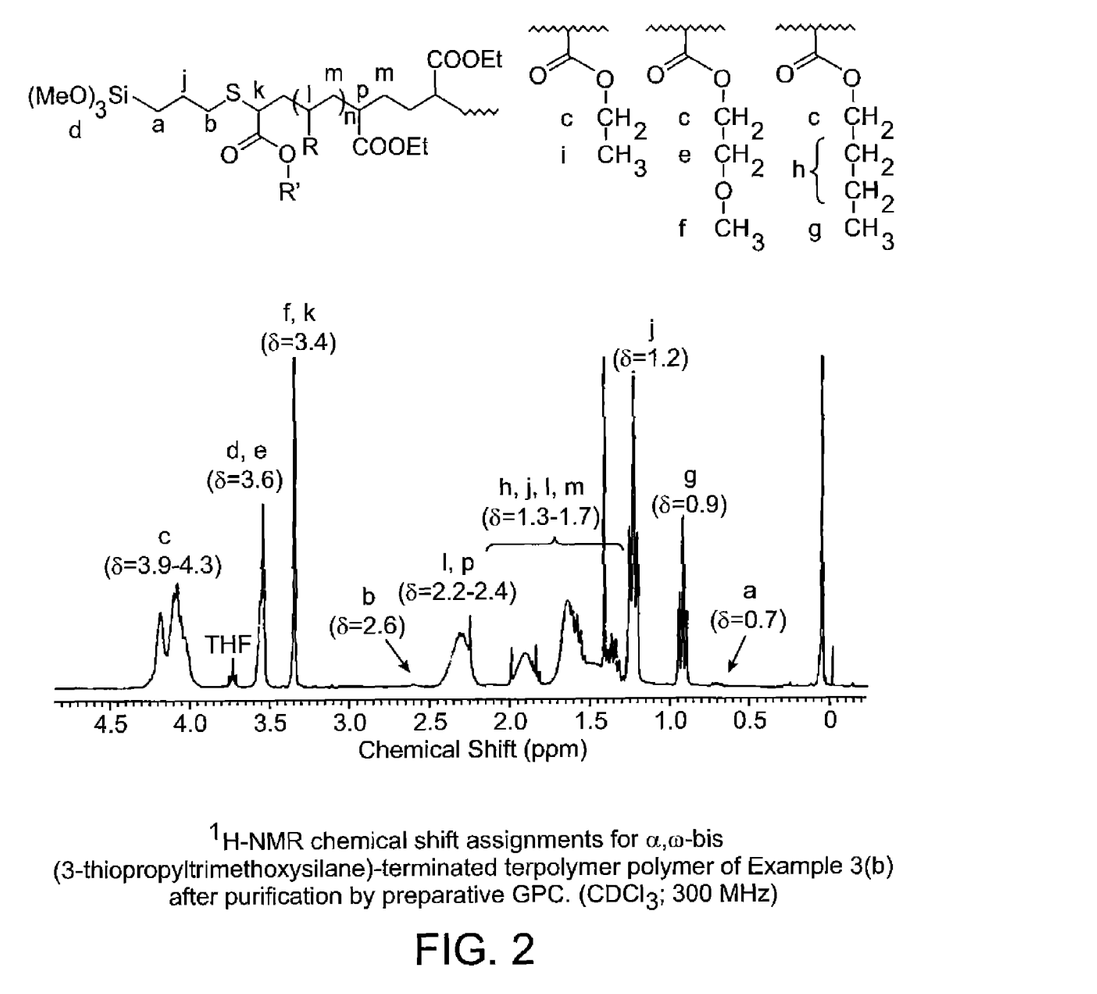
FIG. 2 is a graph of an NMR analysis confirming the polymer structure of Example 3.

R = —COOR'; R' = —OC(O)—CH$_2$—CH$_3$,
—OC(O)—CH$_2$—CH$_2$—OCH$_3$ and —OC(O)—(CH$_2$)$_3$—CH$_3$ To a 500 mL jacketed glass reactor equipped with thermocouple, mechanical stirrer, dry-ice condenser, argon sweep line was added a solution of dibromo-terminated 5/3/2 BA/MEA/BA polyacrylate terpolymer prepared as described above (125 g; 6.25 mmoles) and tetrahydrofuran (THF; 250 g). The circulation temperature was adjusted to 50° C. and the mixture stirred until a clear solution was obtained. The headspace was swept with argon to remove air and dibenzo-18-crown-6 (1.12 g; 3.11 mmoles), anhydrous potassium carbonate (5.18 g; 3.75 mmoles) and 3-mercaptopropyl trimethoxysilane (7.36 g; 3.75 mmoles) were added to the stirred mixture. The mixture was stirred for 16 hours at 50° C., cooled to ambient temperature and filtered through a bed of neutral alumina to remove insoluble salts. Solvent was removed from the filtrate to yield α,ω-bis(3-thiopropyltrimethoxysilane)-terminated terpolymer (94.6 g; 76%). The structure of the polymer was confirmed by $^1$H NMR (FIG. 2).

EXAMPLE 4

Moisture Cure Compositions Using the Inventive Polymers

The curable compositions (resins) of the present invention were formulated into moisture curable compositions and tested for physical properties. Table I below sets forth Inventive Compositions 1-3. Composition 1 uses the resin from Inventive Example 3(b). Composition 2 uses the resin from Inventive Example 1 and Composition 3 uses the resin of Inventive Example 2.

TABLE I

Moisture Curable Compositions

| | Weight % | | |
|---|---|---|---|
| Component | Inventive Composition 1 | Inventive Composition 2 | Inventive Composition 3 |
| Resin From Inventive Example 3(b) | (44.00 g) | — | — |
| Resin From Inventive Example 1 | — | (43.29 g) | — |
| Resin From Inventive Example 2 | — | — | (4.09 g) |
| Plasticizer | (3.16 g) | (3.01 g) | (0.296 g) |
| Hydrophobic Powdered Silica | (2.01 g) | (1.99 g) | (0.510 g) |
| VTMS | (0.79 g) | (0.79 g) | (0.079 g) |
| APTMS | (1.013 g) | (0.99 g) | (0.101 g) |
| Moisture Cure Catalyst | (1.02 g) | (1.01 g) | (0.104 g) |

Inventive Compositions 1 and 2 were tested for physical properties summarized in Table II.

TABLE II

Tensile Strength, Shear Modulus, Elongation, and Hardness

| | Tensile (psi) | 50% Modulus (psi) | Elongation (%) | Hardness (Shore A) |
|---|---|---|---|---|
| Inventive Composition 1 | 94 ± 5 | 54 ± 0.9 | 107 ± 8 | 31 |
| Inventive Composition 2 | 24 ± 2 | — | 48 ± 4 | 13 |

The development of physical properties is indicative of the effectiveness of the reaction to develop clusters at or near the terminal ends. While these formulations can be further optimized, the ability to provide an inexpensive and effective method of enriching the functionality of the polymer ends is demonstrated.

Figure 3:
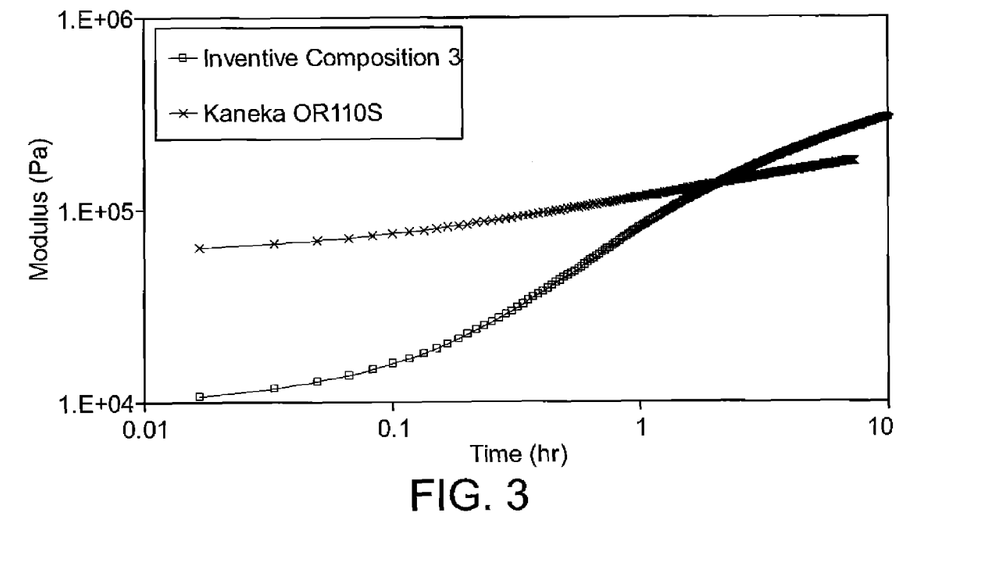
FIG. 3 is a graph showing modulus measurements as a function of cure-time in a control sample and an inventive sample.

Composition 3 (Inventive Example 2 Resin) was mixed, then placed on a rheometer for characterization (8 mm plate, 25° C., r=1%, w=30 rad/s, Fn=0). Modulus was plotted as a function of time and compared to a commercially available moisture curing polyacrylate resin Kaneka OR110S which does not contain the inventive resins, as shown in FIG. 3. Composition 3 (Inventive Resin 2) with clustered functionality cured significantly faster, as indicated by a development of higher modulus in a shorter time period, than the commercially available Kaneka resin, and provided a higher modulus plateau than the Kaneka resin.

EXAMPLE 5

Dual Cure Blended Compositions (UV & Moisture)

The moisture curable Composition 2 above was blended with a commercially available UV curable resin (Kaneka RC220C) and photoinitiator (Darocure 1173) to form three distinct dual curing compositions, A, B and C. Table III below sets forth the relative amounts in weight of the components in each of Composition A-C.

TABLE III

| Component | Composition A (1:1) | Composition B (1:2) | Composition C (2:1) | Kaneka RC220C Alone |
|---|---|---|---|---|
| Inventive Example 1 Resin | 3.29 g | 4.88 g | 2.46 g | — |
| Kaneka RC220C | 4.10 g | 2.96 g | 5.90 g | 98.5 |
| Plasticizer | 0.25 g | 0.362 g | 0.186 g | |
| Hydrophobic Powdered Silica | 0.41 g | 0.625 g | 0.312 g | |
| VTMS | 0.07 g | 0.097 g | 0.48 g | |
| APTMS | 0.08 g | 0.120 g | 0.059 g | |
| Moisture Cure Catalyst | 0.08 g | 0.118 g | 0.059 g | |
| UV Initiator | 0.06 g | 0.045 | 0.092 g | 1.5 |

Dual Cure System A—had a 1:1 ratio of UV cure:Moisture cure parts. The UV part was 4.16 g of the total of the UV-part formulation, which comprised commercially available Kaneka RC220C with 1.5 wt % darocur 1173, a UV initiator. The moisture part was 4.18 g total of the prepared moisture part formulation, which included the components included in table IV.

TABLE IV

| Component | Amount (g) |
|---|---|
| Composition A | 8.63 |
| Plasticizer, alkyl sulfonic ester of phenol | 0.657 |
| Hydrophobic powdered silica | 1.075 |
| Vinyltrimethoxysilane | 0.179 |
| 3-aminopropyltrimethoxysilane | 0.221 |
| Dibutyltin dilaurate | 0.222 |
| Total | 10.984 |

Figure 4:
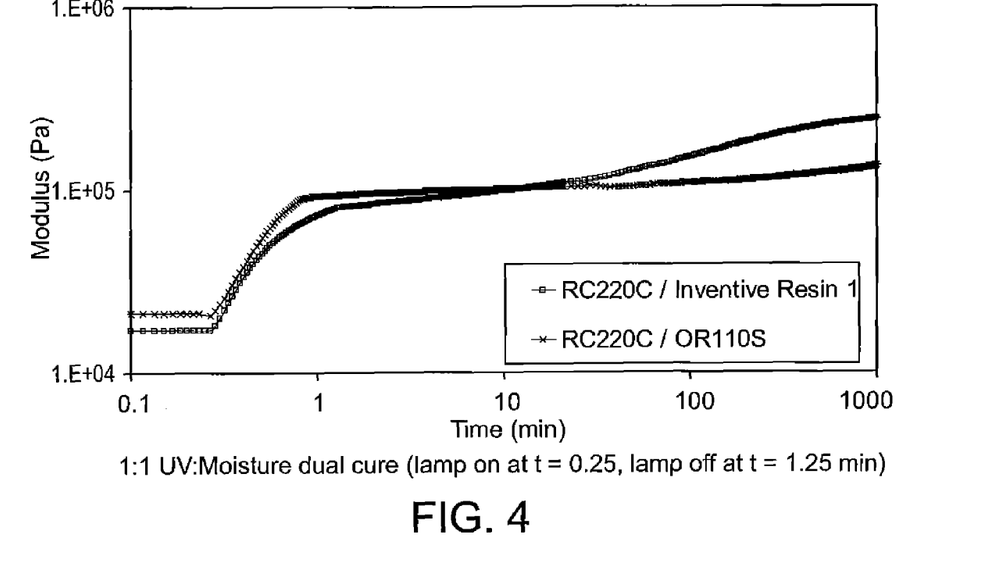
FIG. 4 is a graph showing modulus measurements as a function of cure-time in a control sample and an inventive blended composition.

The UV:Moisture Dual Cure System (Composition A) having a 1:1 ratio was analyzed on a rheometer using an 8 mm plate, 1 mm gap, at 25° C. A UV dose of 60 seconds at 103 mW/cm$^2$ was completed, the applied strain (γ)=1%, while angular frequency (ω)=30 rad/s. As compared to the RC220C/OR110S control sample, the results are shown in FIG. 4.

Dual Cure System (Composition B)—1:2 UV:Moisture cure part ratio. The UV part was 3.01 g of the UV-part formulation, which comprised Kaneka RC220C with 1.5 wt % darocur 1173. The moisture part was 6.182 g total of the prepared moisture part formulation, which included the components set forth in Table V:

TABLE V

| Component | Amount (g) |
| --- | --- |
| Composition B | 4.88 |
| Plasticizer, alkyl sulfonic ester of phenol | 0.362 |
| Hydrophobic powdered silica | 0.605 |
| Vinyltrimethoxysilane | 0.097 |
| 3-aminopropyltrimethoxysilane | 0.120 |
| Dibutyltin dilaurate | 0.118 |
| Total | 6.182 |

All ingredients were mixed except for the dibutyltin dilaurate, the jar was purged with nitrogen gas and stored in the dark overnight. The next day, dibutyltin dilaurate was added and the sample thickened considerably but did not gel. Dual Cure System B was analyzed on a rheometer using an 8 mm plate, a 1 mm gap, and UV dose of 90 seconds at 103 mW/cm$^2$ ($\gamma=1\%$, $\omega=30$ rad/s).

Dual Cure System (Composition C)—had a 2:1 UV:Moisture cure part ratio. The UV part was 5.90 g of Kaneka RC220C with 0.092 g of Darocur 1173, a UV initiator. The moisture part was 3.556 g total of the prepared moisture part formulation, which included the components set forth in Table VI.

TABLE VI

| Component | Amount (g) |
| --- | --- |
| Composition C | 2.46 |
| Plasticizer, alkyl sulfonic ester of phenol | 0.186 |
| Hydrophobic powdered silica | 0.312 |
| Vinyltrimethoxysilane | 0.48 |
| 3-aminopropyltrimethoxysilane | 0.059 |
| Dibutyltin dilaurate | 0.059 |
| Total | 3.556 |

Both the UV part and the Moisture part were mixed with a speed mixer, the resulting Dual Cure System C was analyzed on a rheometer using an 8 mm plate, a 1 mm gap, and UV dose of 90 seconds at 103 mW/cm$^2$ ($\gamma=1\%$, $\omega+30$ rad/s).

Figure 5:
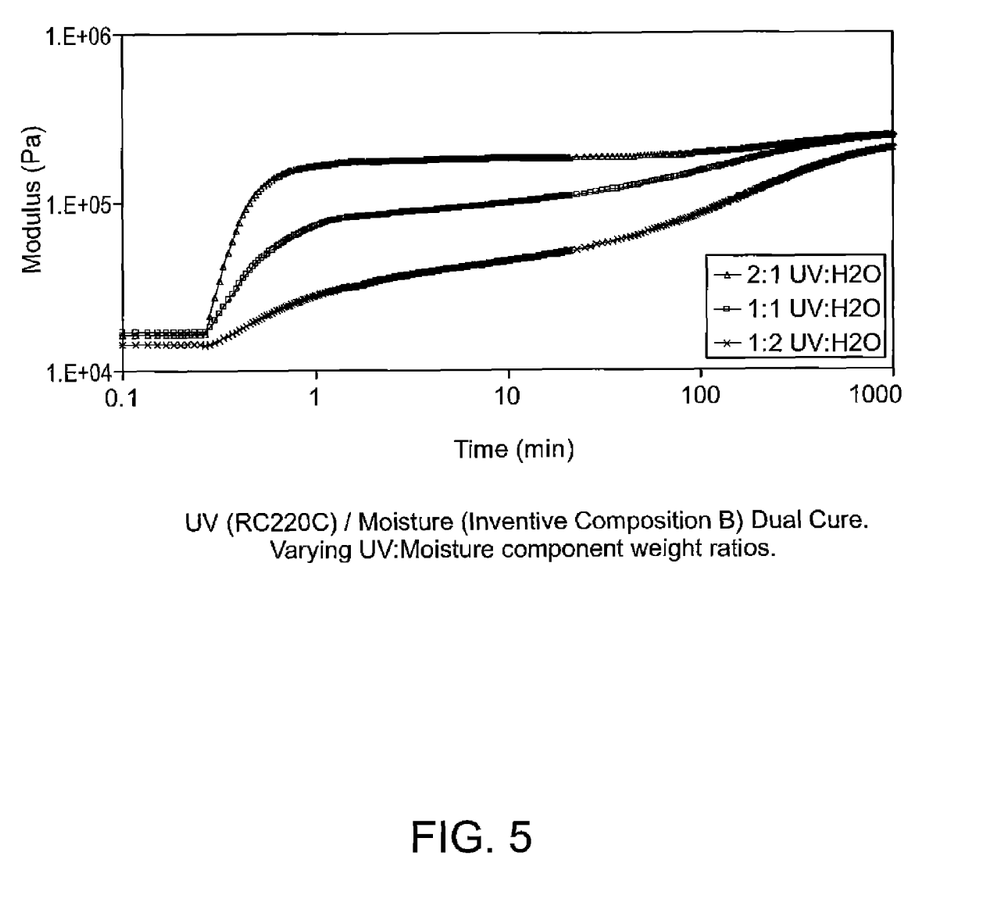
FIG. 5 is a graph showing modulus measurements as a function of cure-time in three inventive blends having different ratios of resins.

In FIGS. 4 and 5, the Dual Cure composition analysis is depicted. These Figures show that the SET-LRP polyacrylate with clustered functionality cured more quickly and provided a higher plateau modulus than the control, Kaneka OR110S. The Rheometer results of Dual Cure Systems A(1:1), B(1:2), and C(2:1) are depicted in FIG. 5.

What is claimed is:

1. A process of controlled radical polymerization to provide a polymer with terminal ends and a cluster of pendent curable reactive sites, said process comprising:
    performing controlled radical polymerization on a composition comprising a vinyl polymerizable compound, an initiator, a ligand, and a catalyst;
    permitting the controlled radical polymerization reaction to proceed until a desired level of conversion is attained, but prior to complete conversion to obtain an intermediate polymerization product; and
    further reacting the intermediate polymerization product with a reactant which exceeds the equivalence of the initiator to provide either a cluster of pendent curable reactive sites adjacent to each terminal end of the polymer chain or a cluster of pendent curable reactive sites adjacent to at least one terminal end of the polymer chain and further at least one free radical curing portion.

2. The process of claim 1, wherein said cluster of pendent curable reactive sites comprises a plurality of pendant moisture-curable functionalities.

3. The process of claim 1, further wherein the polymerizable compound is selected from the group consisting of: a monomer, a copolymer, a block copolymer, a gradient polymer and combinations thereof.

4. The process of claim 1, wherein the polymer with a cluster of pendent curable reactive sites further includes at least one free radical curing portion.

5. The process of claim 1, wherein permitting the polymerization to proceed further includes permitting a single electron transfer living radical polymerization to proceed.

6. The process of claim 1, wherein permitting the polymerization to proceed further includes permitting atom transfer radical polymerization to proceed.

7. The process of claim 1, wherein the initiator conforms to the formulas R—X wherein X is a halogen and R is $C_1$-$C_6$ alkyl.

8. The process of claim 1 wherein the initiator is selected from the group consisting of diethyl meso-2,5-dibromoadipate; dimethyl 2,6-dibromoheptanedioate ; ethylene glycol bis(2-bromopropionate); ethylene glycol mono-2-bromopropionate; trimethylolpropane tris(2-bromopropionate); pentaerythritol tetrakis (2-bromopropionate); 2,2-dichloacetophenone; methyl 2-bromopropionate; methyl 2-chloropropionate; N-chloro-2-pyrrolidinone; N-bromosuccinimide; polyethylene glycol bis(2-bromopropionate); polyethylene glycol mono(2-bromopropionate) ; 2-bromopropionitrile; dibromochloromethane; 2,2-dibromo-2-cyanoacetamide; α,α'-dibromo-ortho-xylene; α,α'-dibromo-meta-xylene; α,α'-dibromo-para-xylene; α,α'-dichloro-para-xylene; 2-bromopropionic acid; methyl trichloroacetate; para-tolunesulfonyl chloride; biphenyl-4,4'-disulfonyl chloride; diphenylether-4,4'-disulfonylchloride bromoform; iodoform carbon tetrachloride; and combinations thereof.

9. The process of claim 1, wherein the ligand includes compounds comprising one or more nitrogen, oxygen, phosphorus and/or sulfur atoms which coordinate to transition metal through a sigma-bond, or compounds comprising two or more carbon atoms which can coordinate to transition metal through a pi-bond.

10. The process of claim 1, wherein the ligand is selected from the group consisting of primary alkyl or aromatic amines, secondary alkyl or aromatic amines, tertiary alkyl or aromatic amines, linear polyamines, branched polyamines, dendritic polyamines, polyamides and combinations thereof.

11. The process of claim 1, wherein the ligand is selected from the group consisting of tris(2-dimethylaminoethyl) amine (Me6-TREN), tris(2-aminoethyl)amine (TREN), 2,2-bipyridine (bpy), N,N,N,N,N-pentamethyldiethylenetriamine (PMDETA) and combinations thereof.

12. The process of claim 1, wherein the catalyst is selected from the group consisting of Cu(0), $Cu_2S$, $Cu_2Te$, $Cu_2Se$, Mn, Ni, Pt, Fe, Ru, V, Au, Ag, Hg, Rh, Co, Ir, Os, Re, Mn, Cr, Mo, W, Nb, Ta, Zn and combinations thereof.

13. The process of claim 1, wherein the permitting step further comprises building at least one polymer from a center region, outward away from the center of the polymer molecule.

14. The process of claim 1 wherein the polymer further comprises curable reactive sites at one terminal end thereof.

15. The process of claim 1 wherein the polymer further comprises curable reactive sites at two terminal ends thereof.

16. The process of claim 1 wherein the polymer with a cluster of pendent curable reactive sites is a vinyl polymer.

* * * * *